United States Patent Office 3,654,283
Patented Apr. 4, 1972

---

3,654,283
2-ARALKYL-3-AROYLQUINOLONES
Kenneth Robert Huffman, 24 Lolly Lane, Stamford, Conn. 06903; Edwin Fisher Ullman, 135 Selby Lane, Atherton, Calif. 94025; and Myrna Loy, 4654 Hazel Ave., Philadelphia, Pa. 19143
No Drawing. Continuation of application Ser. No. 739,136, June 24, 1968, which is a continuation-in-part of application Ser. No. 418,295, Dec. 14, 1964. This application May 13, 1970, Ser. No. 37,426
Int. Cl. C07d 33/46
U.S. Cl. 260—289 R          1 Claim

ABSTRACT OF THE DISCLOSURE 2-aralkyl-3-aroylquinolones are prepared which have the formula

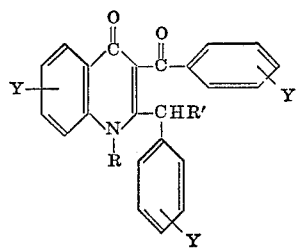

wherein R and R' are hydrogen, lower alkyl or phenyl-substituted lower alkyl and Y is hydrogen, hydroxy, cyano, nitro, halogen, phenyl, tolyl, lower alkyl, alkoxy or alkylthio or di(lower alkylamino). They are prepared by ring-closing the corresponding 2-aroyl-3-anilino-4-arylcrotonates. Photochromic compounds may then be obtained by salt formation and alkylation.

---

This is a continuation of our copending application S.N. 739,136, filed June 24, 1968, which in turn is a continuation-in-part of S.N. 418,295, filed Dec. 14, 1964, both now abandoned.

This invention relates to a new class of 2,3-disubstituted quinolones that are useful in the preparation of photochromic compositions. The invention includes the new quinolones themselves, their methods of preparation, and photochromic compositions prepared therefrom.

The new compounds of our invention are 2-aralkyl-3-aroylquinolones of the formula (I)
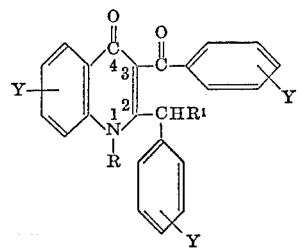

in which R and R' are hydrogen, lower alkyl of 1 to 6 carbon atoms or phenyl-substituted lower alkyl and Y is hydrogen, hydroxy, lower alkyl, lower alkoxy, lower alkylthio, cyano, nitro, halogen, di(lower alkylamino), phenyl or tolyl, where lower alkyl means from 1 to 6 carbon atoms, and where R and R¹ and also the three occurrences of Y may be the same or different.

We have found that compounds of this formula in which the nitrogen is tertiary (i.e. R is not hydrogen) will, when activated by the absorption of ultraviolet light, undergo a reversible photoenolization of the type

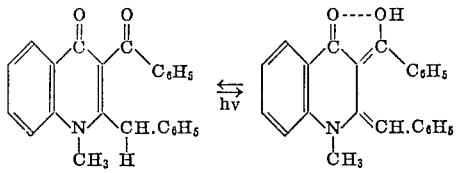

They are therefore useful alone or in combination with other materials in any system benefiting from this type of photochromism. Thus, among numerous and varied applications may be mentioned photochromic sunglasses, variable transparency windows, novelty jewelry and toys, memory devices, photography, photocopying, optical masks, photochromic printing paper, and the like.

Films containing these compounds are particularly useful. For example, such compounds may be dissolved in a suitable solvent such as benzene or acetone and the like, and a solution prepared containing the photochromic compound and a thermoplastic polymer, e.g., a 20% by weight solids solution, based on dry weight of additives, with polymethylmethacrylate (95% polymer and 5% photochromic compound). This solution is then spread on a polyester film in a conventional manner and the thus-coated plastic used as optical masks, memory tapes, etc.

The compounds of Formula I in which R is hydrogen are useful intermediates for preparing the corresponding tertiary nitrogen-containing photochromic quinolones. This can easily be done by alkylating them with an alkyl or aralkyl halide such as methyl or benzyl iodide or chloride in the presence of salt-forming quantities of a base capable of forming a salt with the 2-aralkyl-3-benzoyl quinolone as will subsequently be more fully described.

In carrying out the process of our invention a 1-unsubstituted 2-aralkyl-3-aroylquinolone is therefore first prepared, preferably by ring-closing the corresponding 2-aroyl-3-anilino-4-arylcrotonate:

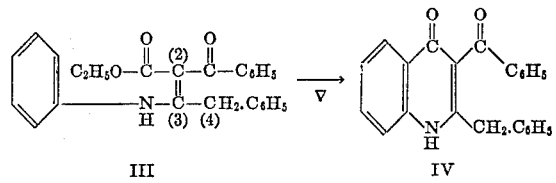

III
Ethyl 2-benzoyl-3-anilino-4-phenylcrotonate

IV
3-benzoyl-2-benzyl-4(1H)quinolone

This is easily accomplished by heating it at about 100° C. to about 300° C. for from about 5 minutes to 3 hours or longer, preferably after dispersing it in a high-boiling solvent such as diphenyl ether. The 1-unsubstituted-2-aralkyl-3-aroylquinolone so prepared (e.g. compound IV) is then alkylated with any conventonal or preferred alkylating agent such as (CH₃)₂CHBr, CH₃CH₂I or other alkyl halides; C₆H₅CH₂Br, C₆H₅CH(CH₃)Br and other phenylalkyl halides; alkyl sulfates such as CH₃OSO₃CH₃; and alkyl phenylsulfonates such as ethyl phenylsulfonate C₂H₅OSO₂C₆H₅.

The alkylation reaction is carried out under basic conditions. This may be done by first converting the 3-aroylquinolone (e.g. compound IV), which is slightly acid, into a salt such as its alkali metal or ammonium salt by reacting it with a stoichiometric equivalent of a corresponding base such as the hydroxide, methylate or hydride of an alkali metal. Alternatively the base and the alkylating agent may be added together. Typical preferred bases include sodium hydride, sodium methoxide, potassium t-butoxide, sodamide and the like. Sodium methoxide is the preferred base.

When one stoichiometric equivalent of base is used the quinolone nitrogen is alkylated. With two or more equivalents of base and of alkylating agent the 2-aliphatic substituent is also alkylated as typified by the following:

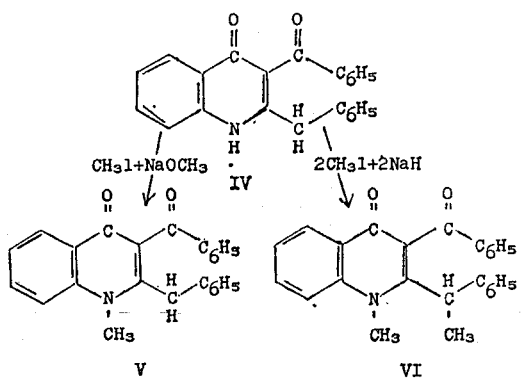

The 1-alkyl and 1-aralkylquinolones typified by Compounds V and VI develop a strong color formation when their solutions in methanol are irradiated with ultraviolet light, and can therefore be used for any of the photochromic purposes outlined above. They are also useful intermediates for producing the corresponding cyclohexadiene compounds by reacting them with a 1,1-dicyanoethylene in the following manner

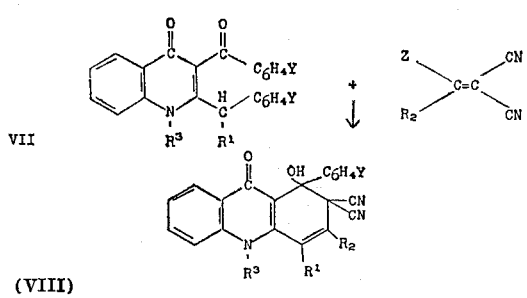

In these compounds $R^3$ is alkyl or phenylalkyl wherein the alkyl groups are from 1 to 6 carbon atoms, $R_2$ is hydrogen, cyano, phenyl or alkyl or phenylalkyl wherein the alkyl groups are from 1 to 6 carbon atoms, and $R^1$ and Y are as defined above. Z does not take part in the formation of product VIII and therefore may be any substituent for the 2-carbon atom of the 1,1-dicyanoethylene used. Such a group is called a "leaving" group and is typified by lower alkoxy of 1 to 6 carbon atoms, phenoxy, halogen, cyano, sulfonoxy, tolylsulfonoxy and the like.

These dicyanoacridans are all strongly photochromic and are therefore useful alone or in combination with other materials in any system benefiting from their reversible photochromic properties. Thus they can be dispersed, as finely divided solids or as solutions in alcohol, for example, into plastic moldings such as methylmethacrylate sheets used in skylights, which will then develop color when exposed to direct sunlight but become clear as the sun goes down.

The above-described process of reacting the 1-substituted 2-aralkyl-3-aroylquinolones of Formula VII with 1,1-dicyanoethylenes was first described and claimed in our application Ser. No. 418,337, filed Dec. 14, 1964, now abandoned, for which our copending applications Ser. Nos. 703,491 filed Nov. 2, 1967, now U.S. 3,578,683 and 681,-936 filed Nov. 9, 1967 have been substituted. The process is carried out by adding a strong base to a solution of the starting compound VII in a suitable solvent such as dioxane and stirring at about 15° C. to 100° C. for several minutes. This causes the base to remove a proton from the starting compound, thereby forming its anionic conjugate base. The 1,1-dicyanoethylene compounds is then added and the mixture is refluxed for from about 20 minutes to 5 hours, or until the dicyanoacridan formation is substantially completed. The product is preferably recovered by evaporating the solvent, dissolving the residue in water and precipitating by adding a mineral acid.

A wide variety of solvents may be used in this process. Thus the dioxane may be replaced by tetrahydrofuran, dimethylsulfoxide, 1,2-dimethoxyethane, alcohols such as isopropanol, t-butanol and the like. Any base capable of conjugation with the starting compound may be used; typical are the alkali metal hydrides, alkoxides and amides such as sodium hydride, sodium triphenylmethide, sodium ethoxide or potassium butoxide and alkali metal dialkylamides such as lithium diethylamide or dipropylamide.

The 2-aroyl-3-anilino-4-arylocrotonates used as starting materials in the process of our invention may be prepared by reacting with benzoyl chloride or other comparable acrylating agent a 3-anilino-4-phenylcrotonic acid ester (Kiang et al., J. Chem. Soc. [1956] 1319) as illustrated by the reaction.

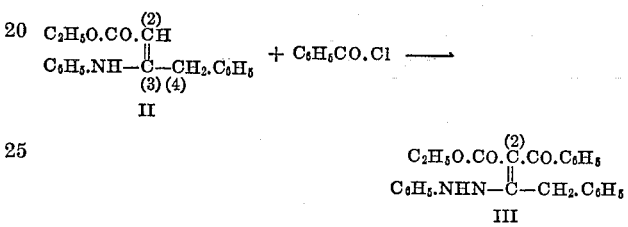

Compounds of Formula III are conveniently prepared by mixing the substituted crotonic acid ester with a base at room temperature to form a salt of said ester and thereafter adding the aroyl derivative and heating gently at from about 30° C. to 150° C. for from about 30 minutes to several hours, e.g., 4 hours. The base acts as a proton acceptor, accepting a proton from the crotonic acid ester and thereby promoting reaction between said ester and aroyl derivative. The three reactants are employed in substantially equimolecular amounts. No particular advantage is gained by varying the quantities of starting compounds and base although substantially lesser or greater amounts than equimolecular proportions may be employed, if desired, for control of rate of reaction and yield.

Any moderately strong base is useful and as typical may be mentioned sodium hydride, sodium ethoxide, potassium t-butoxide, sodamide, lithium diethyl amide, and the like.

The reaction of substituted crotonic acid ester, base, and aroyl derivative is conveniently conducted in an inert organic solvent medium, polar or non-polar, but preferably a non-hydroxylic solvent such as a hydrocarbon e.g., benzene, toluene; a substituted hydrocarbon, e.g., carbon disulfide, chlorobenzene, nitrobenzene, e.g., dichloroethylene; or ethers, e.g., diethylether, tetrahydrofuran, dioxane; and the like.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claim.

EXAMPLE 1

Preparation of 3-benzoyl-2-benzyl-4(1H)quinolone

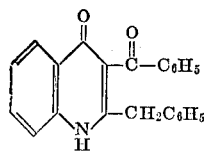

To a cold stirred suspension of 4.8 grams of 50% sodium hydride dispersion (0.10 mole) in 80 ml. of toluene under nitrogen is added dropwise a solution of 28.1 grams (0.10 mole) of ethyl-3-anilino-4-phenyl-crotonate in 125 ml. toluene. After stirring for 4 hours at room temperature, a solution of 14.0 grams of benzoyl chloride (0.01 mole) in 25 ml. toluene is added dropwise. The resulting mixture is heated on a steam bath with stirring for 2 hours and then allowed to stand for about 16 hours at 25° C.

To this mixture 100 ml. of 1.5 N hydrochloric acid is added cautiously with stirring and the organic layer is separated and washed with saturated sodium bicarbonate. Evaporation of the dried solution and addition of ether causes crystallization of some benzanilide which is removed by filtration. The filtrate is evaporated and the residual oil extracted several times with boiling petroleum ether. Evaporation of this extract gives the following ethyl 2-benzoyl-3-anilino-4-phenylcrotonate as a crude oil:

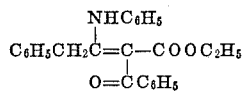

The above oil is added to 250 ml. of diphenyl ether at 230° C. with stirring and the mixture refluxed for 15 minutes. Addition of petroleum ether to the cooled mixture gives a brown gum which is crystallized from methanol. Two recrystallizations from dilute ethanol give 9.0 grams (27% yield) of the quinolone as colorless prisms, M.P. 260–262° C.

*Analysis.*—Calc'd for $C_{23}H_{17}NO_2$ (percent): C, 81.39; H, 5.05; N, 4.13. Found (percent): C, 80.49; H, 5.35; N, 4.16.

EXAMPLE 2

Preparation of 3-benzoyl-1-methyl-2-(1-phenyl-ethyl)-4(1H)quinolone

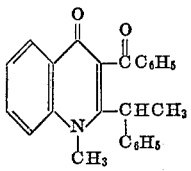

To a stirred mixture of 0.65 grams (0.0135 mole) of sodium hydride (50% suspension in mineral oil) in 1,2-dimethoxyethane under nitrogen is added a suspension of 2.0 grams (0.0059 mole) of the 3-benzoyl-2-benzyl-4-(1H)quinolone of Example 1 in the same solvent. This is followed by the addition of 3 ml. of methyl iodide. The mixture is then stirred at reflux for one hour and stirring continued at room temperature for about 16 hours longer. One ml. more of methyl iodide is then added followed by one more hour of heating at reflux.

The residue obtained on evaporation of the solvent is washed with petroleum ether, triturated with water and dried. Two recrystallizations from methanol-water gave 1.0 gram, M.P. 171–172° C., of 3-benzoyl-1-methyl-2-(1-phenylethyl)-4(1H)quinolone.

*Analysis.*—Calc'd for $C_{25}H_{21}O_2N$ (percent): C, 81.72; H, 5.76; N, 3.81. Found (percent): C, 81.02; H, 5.81; N, 3.95, 4.21.

A coating solution containing 20% of polymethyl methacrylate in methylene chloride, 3% of hydrogenated terphenyl plasticizer and 0.2% of the above-described quinolone was prepared. This was applied as a uniform film to glass and the solvent was evaporated. A second sheet of glass was coated with another portion of the same solution and after drying the two sheets were pressed together with the films in contact. The resulting sandwich was clear in a subdued light, but became tinted upon exposure to sunlight.

EXAMPLE 3

Preparation of 3-benzoyl-2-benzyl-1-methyl-4(1H)quinolone

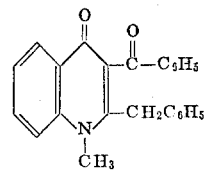

Finely divided 3-benzoyl-2-benzyl-4(1H)quinolone (2.10 grams, 0.0062 mole) is added to 0.0062 mole of sodium methoxide in 25 ml. methanol under nitrogen and the mixture is stirred until a clear solution forms. The methanol is removed in vacuo and dry 1,2-dimethoxyethane (distilled) from LiAlH$_4$) added. The solution is then re-evaporated to remove any residual methanol. The resulting sodium salt is redissolved in 1,2-dimethoxyethane and then added dropwise with stirring to a stirred solution of 8 ml. of iodimethane in 20 ml. of 1,2-dimethoxyethane at 60° C. under nitrogen. The solution is refluxed for an hour and allowed to stand for about 16 hours at room temperature. The solvent is removed and the residue taken up in hot benzene and filtered. The oil obtained from evaporation of the filtrate is crystallized from ethanol to give 1.65 grams (75% yield) of the N-methyl compound depicted above, M.P. 177–178° C. Recrystallization from ethanol raised the M.P. to 178–179° C.

*Analysis.*—Calc'd for $C_{24}H_{19}NO_2$ (percent): C, 81.56; H, 5.42; N, 3.96. Found (percent): C, 80.82; H, 5.35; N, 4.32.

Preparation of 1,4-diphenyl-1-hydroxy-10-methyl-9-oxo-2,2,3[1H]-acridantricarbonitrile.

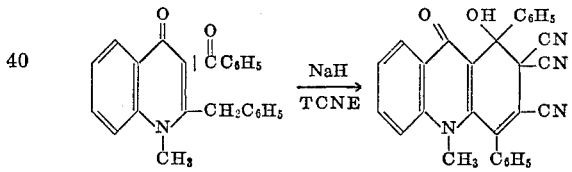

A solution of 1.17 parts of the above-described 3-benzoyl-2-benzyl-1-methyl-4(1H)-quinolone in 25 parts by volume dry tetrahydrofuran (prepared by stirring the mixture under nitrogen for 30 minutes) was added dropwise to a stirred suspension of 0.32 part of 50% sodium hydride dispersion in 10 parts by volume of tetrahydrofuran under nitrogen. The mixture was warmed slightly at the beginning of the addition to initiate the reaction and then refluxed for 5 minutes after the addition was complete. The resutling deep red solution was cooled and 0.45 part of tetracyanoethylene (TCNE) was added. Stirring was continued for 1 hour at room temperature and 1½ hours at reflux.

The excess sodium hydride was decomposed by the addition of wet tetrahydrofuran and the solution was evaporated to give a black residue which was dissolved in water. The aqueous solution was washed twice with 2:1 ether-chloroform mixture and then acidified to pH 2 with 6 N HCl. After saturating the solution with sodium chloride it was extracted several times with chloroform. The dried extracts were evaporated and the residue was triturated with ether to give 1,24 parts of brown solid, molting point 170° C. (decomposition). Crystalliztaion from methylene chloride-petroleum ether gave a first crop which was recrystallized from the same solvent mixture to yield 0.30 part (20%) of golden yellow crystals, melting point 210° C., (decomposition).

*Analysis.*—Calc'd for $C_{29}H_{18}N_4O_2 \cdot CH_2Cl_2$ (percent): C, 66.80; H, 3.73; N, 10.39. Found (percent): C, 66.23; H, 3.91; N, 10.44.

This photochromic compound is described and claimed in our copending application Ser. No. 703,491 filed Nov. 2, 1967 now U.S. 3,578,683.

EXAMPLE 4

Preparation of 3-benzoyl-1-methyl-2-(1-phenylpropyl)-4(1H) quinolone

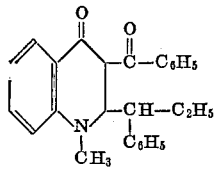

Finely divided 3-benzoyl-2-benzyl-1-methyl4-(1H)-quinoline (2.19 grams, 0.0062 mole) is added to 0.0062 mole of sodium methoxide in 25 ml. of methanol under nitrogen and the mixture stirred until a clear solution forms. The methanol is removed in vacuo and dry 1,2-dimethoxyethane added. The solution is then re-evaporated to remove any residual methanol and the resulting salt redissolved in 1,2-dimethoxyethane and added dropwise with stirring to a stirred solution of 8 ml. of ethyliodide in 20 ml. of dimethoxyethane at 60° C. under nitrogen. The solution is then refluxed for one hour and allowed to stand for about 16 hours at room temperature.

The residue obtained on evaporation of the solvent is washed with petroleum ether, triturated with water and dried. Two recrystallizations from methanol-water give 0.8 gram of 3-benzoyl-1-methyl-2-(1-phenylpropyl)-4-(1H)-quinolone, a photochromic compound.

EXAMPLES 5–47

Tables I and III below summarize conditions for preparation of other products which are illustrative of the present invention. The tables describe the processes in terms of the following flow sheet. Thus Table I describes the preparation of product (A) of the flow sheet followed by formation (by pyrolysis) of product $(II_a)$. Table II shows the preparation of products $(II_b)$ or $(II_c)$ from the Table I products. Whether $(II_b)$ or $(II_c)$ is formed depends on the molecular equivalents of base employed: $(II_b)$ is the product when 2 molecular equivalents are utilized and $(II_c)$ is the product resulting from 1 molecular equivalent of base. In each case a molar excess of $R_5X$ or $R_6X$ is employed.

Table III shows the preparation of miscellaneous products, including product $(II_d)$ of the flow sheet wherein $R_5$ and $R_6$ are different. The latter compounds result from a two step reaction starting with compound $(II_a)$: the formation of $(II_c)$ by reaction with 1 molecular equivalent of base and molar excess of $R_5X$ followed by formation of $(II_d)$ by reaction with 1 molecular equivalent of base and molar excess of $R_6X$. In each of Examples 22–47 the products contain $R_1$ and $R_4$ from the designated products of Tables I and II. All other reaction conditions are essentially the same as described in Examples 1–4.

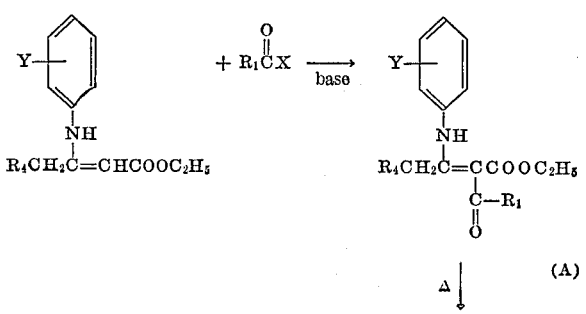

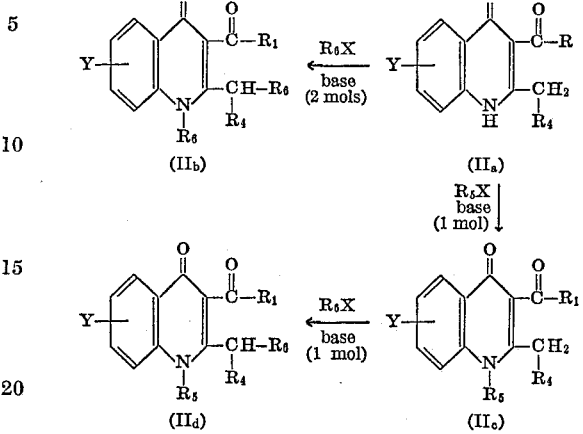

Products $(II_a)$ to $(II_d)$ in the flow sheet above are encompassed by general Formula I and $R_1$, $R_4$, $R_5$, $R_6$ and Y are as follows. $R_1$ and $R_4$ are selected from the group consisting of phenyl and substituted phenyl, said substituents for phenyl being selected from the group consisting of hydroxy, lower alkyl, lower alkoxy, lower alkyl thio, cyano, nitro, di(lower alkyl) amino, halogen and trifluoromethyl; Y is selected from the group consisting of hydrogen, hydroxy, lower alkyl, trifluoromethyl, lower alkoxy, lower alkyl thio, cyano, nitro, halogen, di(lower alkyl)amino, phenyl and lower alkyl-substituted phenyl; and $R_5$ and $R_6$ are selected from the group consisting of hydrogen, lower alkyl and phenyl-substituted lower alkyl. In the above formula $R_1$ and $R_4$ as well as $R_5$ and $R_6$ may be the same or different. X is a "leaving" group, i.e., a group which does not become a portion of (II). Typical "leaving" groups are halogen, e.g., chlorine, bromine, p-toluene, sulfonoxy 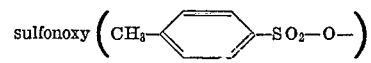

methyl sulfonoxy, and the like, and may be the same or different in $R_1CX$, $R_5X$ and $R_6X$.

The first reaction results in the formation of compound (A) above which is then pyrolyzed to product $(II_a)$. If desired, product (A) may be isolated, purified and then pyrolyzed to $(II_a)$; however, no particular advantage is achieved thereby. Preferably, the reaction mixture containing (A) is concentrated by conventional means such as extraction and filtration, dispersed or dissolved in a high boiling inert organic solvent such as dimethylsulfoxide, diphenyl ether, dioxane, nitrobenzene or bis(2-methoxyethyl) ether and pyrolyzed.

Pyrolysis is conducted in a conventional manner at from about 100° C. to 300° C. for from about 5 minutes to several hours, e.g., 3 hours. Depending on the choice of solvent, reaction may be under reflux conditions.

Product $(II_a)$ is thereafter separated and purified by normal procedures such as extraction and crystallization. These compounds are then used in the preparation of compounds $(II_b)$, $(II_c)$, and $(II_d)$.

As indicated in the flow sheet above, product $(II_b)$ has substituent $R_5$ equal to $R_6$ ($R_5$ is shown as $R_6$). This double substitution is effected easily by reacting compound $(II_a)$ with at least two molecular equivalents of a moderately strong base followed by reaction with a molar excess of $R_6X$.

$R_5X$ and $R_6X$ are compounds as defined above and include reagents such as alkyl phenylsulfonates, e.g., ethyl phenylsulfonate $C_2H_5OSO_2C_6H_5$; alkyl sulfates, e.g., $CH_3OSO_3CH_3$; alkyl halides, e.g., $(CH_3)_2CHBr$, $CH_3CH_2I$ phenylalkyl halides, e.g., $C_6H_5CH_2Br$, $C_6H_5CH(CH_3)Br$; and the like.

Any of the bases set forth above may be employed although some are more effective than others. Typical bases include sodium hydride, sodium methoxide, potassium t-butoxide, sodamide, an the like. Sodium methoxide is the preferred base.

Reaction is preferably conducted in an inert organic solvent, preferably a polar solvent such as 1,2-dimethoxyethane, tetrahydrofuran and the like. Room temperature and from about 1 to 10 hours' reaction time are suitable conditions although reflux temperature is also effective, depending on choice of solvent. The latter conditions are not critical and may be substantially varied. Product ($II_b$) is thereafter isolated in the conventional manner.

Compound ($II_c$) represents a product of the present invention wherein only the nitrogen atom of ($II_b$) is substituted by lower alkyl or phenyl-substituted lower alkyl. This monosubstitution is easily effected substantially in accordance with the foregoing procedure except that only one molecular equivalent of base is employed, followed by at least one molecular equivalent of $R_5X$ (but preferably a molar excess).

Compound ($II_d$) is derived from ($II_c$) and differs from ($II_b$) in that $R_5$ and $R_6$ may be different substituents. This product is formed by reacting ($II_c$) with a molecular equivalent of any suitable base such as those already mentioned followed by reaction with at least one molecular equivalent of $R_6X$ (preferably a molar excess) wherein $R_6$ is different from $R_5$.

Reaction temperature, time and solvent are not critical and may be varied in the same fashions as already indicated for the preparation of ($II_b$) from ($II_a$).

Any of the above procedures may be run at atmospheric, subatmospheric or superatmospheric pressure. Likewise, where practical, the procedures may be batch, semi-continuous, or continuous and the sequence of addition of the reactants to one another is not critical.

TABLE I.—PREPARATION OF (A)

Preparation of Product ($II_a$)

| Ex. No. | Y | $R_1$ | $R_4$ | X | Solvent | Base | Pyrolysis temp., °C. | Pyrolysis solvent |
|---|---|---|---|---|---|---|---|---|
| 5 | 5-$CH_3$ | o-$C_6H_4CN$ | p-$C_6H_4N(CH_3)_2$ | Cl | Toluene | NaH | 230 | Diphenylether. |
| 6 | 6-Br | p-$C_6H_4SCH_3$ | o-$C_6H_4CF_3$ | Br | Benzene | $NaOC_2H_5$ | 200 | Dimethylformamide. |
| 7 | 8-CN | p-$C_6H_4N(CH_3)_2$ | $C_6H_5$ | Br | $CS_2$ | $KOC(CH_3)_3$ | 200 | Dimethylsulfoxide. |
| 8 | 7-$C_6H_5$ | m-$C_6H_4OH$ | m-$C_6H_4Br$ | Cl | Dioxane | $KOC(CH_3)_3$ | 210 | Nitrobenzene. |
| 9 | 7-$C_6H_4CH_3$ | $C_6H_5$ | p-$C_6H_4CN$ | Cl | do | $LiN(C_2H_5)_2$ | 210 | Do. |
| 10 | 5-OH | p-$C_6H_4NO_2$ | o-$C_6H_4OC_2H_5$ | Cl | Diethyl ether | $NaNH_2$ | 250 | Diphenylether. |
| 11 | 5-$OCH_3$ | p-$C_6H_4N(C_2H_5)_2$ | o-$C_6H_4CH_3$ | Br | Toluene | NaH | 155 | Anisole. |
| 12 | 7-$N(CH_3)_2$ | m-$C_6H_4CF_3$ | m-$C_6H_4NO_2$ | Cl | do | NaH | 200 | Bis-(2-methoxyethyl)-ether. |
| 13 | 5-$NO_2$ | o-$C_6H_4Cl$ | o-$C_6H_4OC_2H_5$ | Cl | Chlorobenzene | $NaOCH_3$ | 296 | Diethylphthalate. |
| 14 | 7-$CF_3$ | p-$C_6H_4Cl$ | p-$C_6H_4SC_3H_7$ | Cl | Nitrobenzene | $NaHN_4$ | 240 | Diphenylether. |
| 15 | 6-$SCH_3$ | m-$C_6H_4C_2H_5$ | m-$C_6H_4OH$ | Cl | Xylene | $NaOCH_3$ | 210 | Dimethylformamide. |
| 16 | H | p-$C_6H_4OCH_3$ | p-$C_6H_4N(C_2H_5)_2$ | Br | Tetrahydrofuran | NaH | 230 | Dimethylsulfoxide. |
| 17 | H | $C_6H_5$ | $C_6H_5$ | Cl | Toluene | NaH | 230 | Diphenylether. |
| 18 | H | p-$C_6H_5N(CH_3)_2$ | $C_6H_5$ | Cl | do | $NaOCH_3$ | 240 | Do. |
| 19 | H | $C_6H_5$ | p-$C_6H_5N(CH_3)_2$ | Cl | Xylene | $NaOC_2H_5$ | 230 | Do. |
| 20 | H | p-$C_6H_5CN$ | $C_6H_5$ | Cl | Toluene | NaH | 210 | Nitrobenzene. |
| 21 | 7-$N(CH_3)_2$ | $C_6H_5$ | $C_6H_5$ | Cl | do | NaH | | Diphenylether. |

TABLE II

Preparation of Products ($II_b$) or ($II_c$)

| Ex. No. | Starting compound (Example) | Base | Equivalent of base | Solvent | $R_5X$ | $R_6X$ | Product |
|---|---|---|---|---|---|---|---|
| 22 | 5 | NaH | 2 | Dimethoxyethane | $CH_3F$ | | $II_b$, $R_6=CH_3$ |
| 23 | 6 | NaH | 2 | Dioxane | $CH_3Br$ | | $II_b$, $R=CH_3$ |
| 24 | 7 | NaH | 2 | do | $CH_3I$ | | $II_b$, $R_6=CH_3$ |
| 25 | 8 | $NaOCH_3$ | 2 | Tetrahydrofuran | $C_6H_5CH_2Cl$ | | $II_b$, $R_6=CH_2C_6H_5$ |
| 26 | 9 | $NaOC_2H_5$ | 2 | Ethanol | $C_6H_5CH(CH_3)Br$ | | $II_b$, $R_6=CH(CH_3)C_6H_5$ |
| 27 | 10 | $KOC(CH_3)_3$ | 2 | t-Butyl alcohol | $C_2H_5I$ | | $II_b$, $R_6=C_2H_5$ |
| 28 | 11 | $NaNH_2$ | 2 | Dimethoxyethane | $C_3H_7I$ | | $II_b$, $R_6=C_3H_7$ |
| 29 | 12 | $LiN(C_2H_5)_2$ | 2 | Dimethylsulfoxide | $(CH_3O)_2SO_2$ | | $II_b$, $R_6=CH_3$ |
| 30 | 13 | NaH | 2 | Dimethoxyethane | $CH_3OSO_2C_6H_5$ | | $II_b$, $R_6=CH_3$ |
| 31 | 14 | $NaOCH_3$ | 2 | do | $(CH_3)_2CHBr$ | | $II_b$, $R_6=CH(CH_3)_2$ |
| 32 | 15 | NaH | 1 | do | $CH_3I$ | | $II_c$, $R_5=CH_3$ |
| 33 | 16 | NaH | 1 | Dioxane | $C_2H_5I$ | | $II_c$, $R_5=C_2H_5$ |
| 34 | 12 | NaH | 1 | do | $CH_3OSO_2C_6H_4CH_3$ | | $II_c$, $R_5=CH_3$ |
| 35 | 10 | $NaOCH_3$ | 1 | Tetrahydrofuran | $C_6H_5CH_2OSO_2C_6H_5$ | | $II_c$, $R_5=CH_2C_6H_5$ |
| 36 | 8 | $NaOC_2H_5$ | 1 | Ethanol | $C_6H_5CH_2Br$ | | $II_c$, $R_5=CH_2C_6H_5$ |
| 37 | 7 | $KOC(CH_3)_3$ | 1 | t-Butyl alcohol | $(CH_3)_2CHBr$ | | $II_c$, $R_5=CH(CH_3)_2$ |
| 38 | 6 | $NaNH_2$ | 1 | Dimethoxyethane | $(C_6H_5)_2CHCl$ | | $II_c$, $R_5=CH(C_6H_5)_2$ |
| 39 | 5 | $LiN(C_2H_5)_2$ | 1 | Dimethylsulfoxide | $C_6H_5CH(C_2H_5)Br$ | | $II_c$, $R_5=CH(C_2H_5)C_6H_5$ |
| 40 | 9 | NaH | 1 | Dimethoxyethane | $C_3H_7I$ | | $II_c$, $R_5=C_3H_7$ |

TABLE III

Preparation of Miscellaneous Products

| Ex. No. | Starting compound (example) | Base | Equivalents of base | Solvent | $R_5X$ | $R_6X$ | Product |
|---|---|---|---|---|---|---|---|
| 41 | 31 | NaH | 1 | Dimethoxyethane | $C_2H_5I$ | | $II_d$, $R_5=CH_3$, $R_6=C_2H_5$ |
| 42 | 34 | $NaOC_2H_5$ | 1 | Dioxane | $CH_3I$ | | $II_d$, $R_5=CH_2C_6H_5$, $R_6=CH_3$ |
| 43 | 38 | $NaNH_2$ | 1 | Tetrahydrofuran | $C_2H_5I$ | | $II_d$, $R_5=CH(C_6H_5)_2$, $R_6=C_2H_5$ |
| 44 | 40 | NaH | 1 | Dimethoxyethane | $(CH_3I)_2SO_2$ | | $II_d$, $R_5=C_3H_7$, $R_6=CH_3$ |
| 45 | 18 | NaH | 2 | do | $CH_3I$ | | $II_b$, $R_6=CH_3$ |
| 46 | 17 | NaH | 1 | do | $C_6H_5CH_2Br$ | | $II_c$, $R_5=CH_2C_6H_5$ |
| 47 | 19 | NaH | 1 | do | $CH_3I$ | | $II_c$, $R_5=CH_3$ |

We claim:

1. Compounds of the formula:

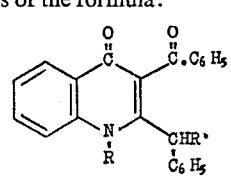

in which R' is hydrogen, alkyl or phenylalkyl, and R is alkyl, provided further that R may also be hydrogen or phenylalkyl when R' is hydrogen; said alkyl groups having from 1 to 6 carbon atoms.

(References on following page)

References Cited

UNITED STATES PATENTS

| | | | |
|---|---|---|---|
| 3,405,137 | 10/1968 | Csapilla | 260—346.2 M |
| 3,470,211 | 9/1969 | Csapilla | 260—346.2 M |
| 3,506,667 | 4/1970 | Kaminsky | 260—289 |
| 3,578,683 | 5/1971 | Loy | 260—346.2 R |

OTHER REFERENCES

Huffman et al.: Jour. Am. Chem. Soc., vol. 87, pp. 5417–23 (1965).

Huffman et al.: Jour Am. Chem. Soc., vol. 88, p. 601 (1966).

DONALD G. DAUS, Primary Examiner

U.S. Cl. X.R.

96—44; 117—138.8, 161; 252—300; 260—283 CN, 283 SY, 286 R, 288 R, 465.1, 482 R